United States Patent
Thakur et al.

(10) Patent No.: US 12,461,907 B1
(45) Date of Patent: Nov. 4, 2025

(54) COMMIT TIME LOGGING FOR TIME-BASED MULTI-VERSION CONCURRENCY CONTROL

(71) Applicant: Amazon Technologies, Inc., Seattle, WA (US)

(72) Inventors: Anand Kumar Thakur, Snohomish, WA (US); Jin Chen, Toronto (CA); Gaurav Kumar Gupta, Waterloo (CA); David Charles Wein, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/478,848

(22) Filed: Sep. 29, 2023

(51) Int. Cl.
*G06F 16/00* (2019.01)
*G06F 16/23* (2019.01)
*G06F 16/2458* (2019.01)

(52) U.S. Cl.
CPC ...... *G06F 16/2379* (2019.01); *G06F 16/2329* (2019.01); *G06F 16/2477* (2019.01)

(58) Field of Classification Search
CPC ............. G06F 16/2379; G06F 16/2329; G06F 16/2477
See application file for complete search history.

(56) References Cited

U.S. PATENT DOCUMENTS

| | | | |
|---|---|---|---|
| 9,665,609 B2 | 5/2017 | Andrei et al. | |
| 10,180,946 B2 | 1/2019 | Brodt et al. | |
| 10,990,581 B1* | 4/2021 | Jain | G06F 16/2358 |
| 11,182,372 B1* | 11/2021 | Jain | G06F 11/1464 |
| 2006/0069885 A1* | 3/2006 | Matsui | G06F 11/1435 |
| | | | 714/E11.131 |
| 2014/0281131 A1* | 9/2014 | Joshi | G06F 12/0804 |
| | | | 711/133 |
| 2019/0102418 A1* | 4/2019 | Vasudevan | G06F 16/27 |
| 2022/0391382 A1* | 12/2022 | Schreter | G06F 16/27 |
| 2022/0398232 A1* | 12/2022 | Sunder | G06F 16/2455 |
| 2023/0081900 A1 | 3/2023 | Werner et al. | |
| 2024/0152384 A1* | 5/2024 | Cramer | G06F 9/466 |

* cited by examiner

*Primary Examiner* — Alexander Khong
(74) *Attorney, Agent, or Firm* — S. Scott Foster; Kowert, Hood, Munyon, Rankin & Goetzel, P.C.

(57) ABSTRACT

Commit time logging is performed as part of implementing time-based Multi-Version Concurrency Control (MVCC). A query engine may determine a commit time for a database transaction is committed to a database by applying MVCC to select different versions of data in the database according to transaction commit times. The query engine may store the commit time for the database transaction in a log structure stored in a non-volatile data store. A segment describing the log structure maintained in a volatile memory maintained in a volatile memory may be updated to include the commit time for the database transaction.

20 Claims, 12 Drawing Sheets

COMMIT TIME LOGGING FOR TIME-BASED MULTI-VERSION CONCURRENCY CONTROL

BACKGROUND

Commoditization of computer hardware and software components has led to the rise of service providers that provide computational and storage capacity as a service. At least some of these services (e.g., managed services such as managed relational database services) may be distributed in order to scale the processing capacity of the service and increase service availability. Because distributed systems may be disrupted due network and other failure scenarios, resiliency to handle these various failure scenarios may be implemented to prevent disruption of client systems or applications that utilize these services.

Figure 1:
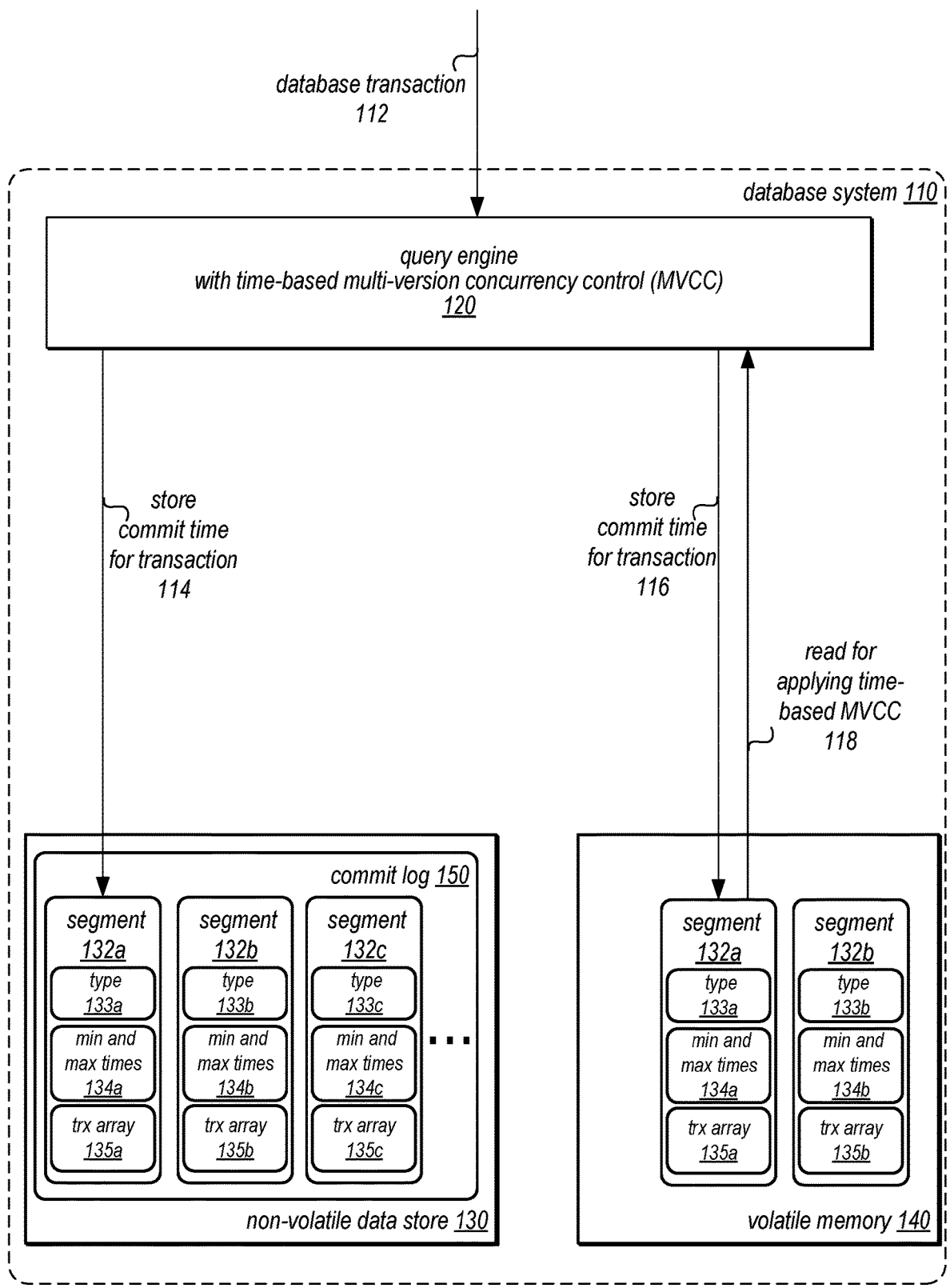
FIG. 1 is a logical block diagram illustrating commit time logging for time-based multi-version concurrency control (MVCC), according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for commit time logging for time-based multi-version concurrency control are described herein. Database systems may support multiple client connections or requests to access a database. Each request (or client) may operate independently of each other. When theses independently operating requests or connections access the same data, techniques for handling concurrent access to data may be implemented. Multi-Version Concurrency Control (MVCC) is one technique for handling concurrent access.

An MVCC technique may utilize multiple versions of database data (e.g., either stored or re-creatable) and select an appropriate one of the versions of database data to use for performing a particular database access. Time-based MVCC may utilize different time values assigned to different versions database data, as well as a time assigned to an access of data in order to select which version of the database data to provide. In order to perform selection of database data versions in time-based MVCC, information, such as the time corresponding to when an update to database data is committed (referred to as "commit time"), may have to be recorded. While different data structures can be used to record commit times, such as a hash table, over time the workload of a database system can cause size and complexity of some data structures to burden performance of the database system. For instance, the size of a hash table stored in memory can consume a large amount of storage space, making it difficult to use the database system's memory to perform other database system operations which may also need to utilize memory.

In various embodiments, commit time logging for time-based MVCC may be implemented to relieve the pressure on system resources to maintain commit times for performing time-based MVCC without sacrificing the performance of requests to access database data that use commit times. As discussed in detail below, different types of segments, which may be different groups or collections of commit times, may be used, converting between time segments and status segments in order to free up space for storing additional commit times without sacrificing quick access to commit times for selecting versions of database data to provide as part of time-based MVCC. Accordingly, commit time logging for time-based MVCC may improve the performance of database systems and other data storage technologies.

FIG. 1 is a logical block diagram illustrating commit time logging for time-based multi-version concurrency control, according to some embodiments. Database system 110 may be a distributed database system, similar to the client-managed or system managed tables discussed below with regard to FIGS. 2-7, or may be a standalone database system (e.g., without distributed storage and/or separate storage). Database system 110 may host or manage access to database (e.g., with database data stored as one or more database tables). Database system 110 may implement a query engine, such as query engine 120, that may perform access requests to the database. In various embodiments, query engine 120 may implement time-based multi-version concurrency control (MVCC). For example, query engine 120 may be handling multiple requests from multiple clients simultaneously. In order to determine which version of data is used for each request for each client in the event that the same data is accessed (e.g., the same row or record in a database table), time-based MVCC may be applied to support consistency and serializability properties (e.g., of the larger set of Atomicity Consistency Isolation and Durability (ACID) properties).

As noted above, time-based MVCC may utilize commit times of updates, sometimes referred to as "transactions" (e.g., single statement transactions such as writes to data to insert, modify/update, or delete the data, or multi-statement transactions that include one or more writes, and possibly one or more reads to the data). A snapshot time (which may describe a state or point-in-time of the database), determined for an access request (e.g., which may be assigned according to a clock time when the access request is received at database system 110) is compared with the commit times of associated transaction(s) for data targeted by the access request in order to determine which version should be selected for performing the access request. In various embodiments, time logging for time-based multi-version concurrency control may be implemented to provide an efficient and durable way to implement time-based MVCC.

As indicated at 112, a database transaction may be received and performed by query engine 120. The database transaction may perform various update(s) to the database data (not illustrated). Once the transaction is to be committed, a commit time may be determined for the database (e.g., the commit time may be determined on a clock time at query engine 120, which as discussed in detail below with regard to FIGS. 2-7 may utilize a time synchronization service). This commit time may be used for performing time-based MVCC.

As indicated at 114, the commit time for the transaction may be stored in both a copy commit log 150 in non-volatile data store 130 (e.g., which persistently stores data across power outages and includes various storage technologies such as disk-based storage, non-volatile ram (e.g., flash storage), solid state drives, and so on) and in volatile memory 140. Commit log 150 may include multiple segments (e.g., collections of transactions and respective transaction data), such as segments 132a, 132b, and 132c. Each segment may be a particular type of segment, time segment or status segment, which may be identified by a stored type indicator, such as type indicators 133a, 133b, and 133c. Each segment 132 may have minimum and maximum commit times describing the range of commit times for transaction stored in a segment, as indicated at 134a, 134b, and 134c. In some embodiments, different segments may store overlapping ranges of commit times (e.g., segment 132a may store some database transaction commit times that could also be within the min and max time times 134b of segment 132b). Transaction arrays, such as transaction arrays 135a, 135b, and 135c, may store the status or commit time of a transaction according to the segment type (e.g., status for status segment and commit time for time segment). In some embodiments, each transaction may be stored in different entry of a transaction array 135. The index value to locate the corresponding entry for a transaction in a transaction array 135 may be determined based on the transaction identifier (e.g., using various mathematical operations to hash, modulo, or otherwise derive an index value given an transaction identifier as an input parameter, as a transaction identifier may be unique). In some embodiments, compare and swap (or other atomic operations) may be performed to update segments 132 so that writing or reading from a segment 132 is lock-free.

The commit time may also be stored in a corresponding segment 132 in the query engine's volatile memory 140 (e.g., byte addressable memory that does not persist data across power loss). For instance, the same updates made to segment 132a in non-volatile data store 130 may be made to segment 132a in volatile memory 140. When an access request is received, segments 132 may first be read from volatile memory, as indicated at 118, in order to apply time-based MVCC. As discussed below with regard to FIG. 9, in some scenarios the segments may be loaded from non-volatile data store 130 into volatile memory 140. As discussed in detail below with regard to FIG. 11, different technique for compacting commit log information may be performed in order to conserve storage space in volatile memory 140 and non-volatile data store 130. For example, the storage space used to store as status segment may be less than for storing a time segment, allowing for conversion between time to status segments to free up additional storage space.

Please note, FIG. 1 is provided as a logical illustration of a database system, non-volatile data store and volatile memory, and is not intended to be limiting as to the physical arrangement, size, or number of components, modules, or devices to implement such features. Moreover, some features, such as transaction arrays 135 may be implemented differently using different data structures (e.g., non-array data structures can be sued to store transaction information in segments 132).

The specification continues with a description of an example network-based database service that supports both a client-managed table and system-managed table in a common database for which commit time logging for time-based multi-version concurrency control may be implemented. Included in the description of the example network-based database service are various aspects of the example network-based database service, such as a database node, router, metadata service, control plane, and a storage service. The specification then describes flowcharts of various embodiments of methods for implementing commit time logging for time-based multi-version concurrency control. Next, the specification describes an example system that may implement the disclosed techniques. Various examples are provided throughout the specification.

Figure 2:
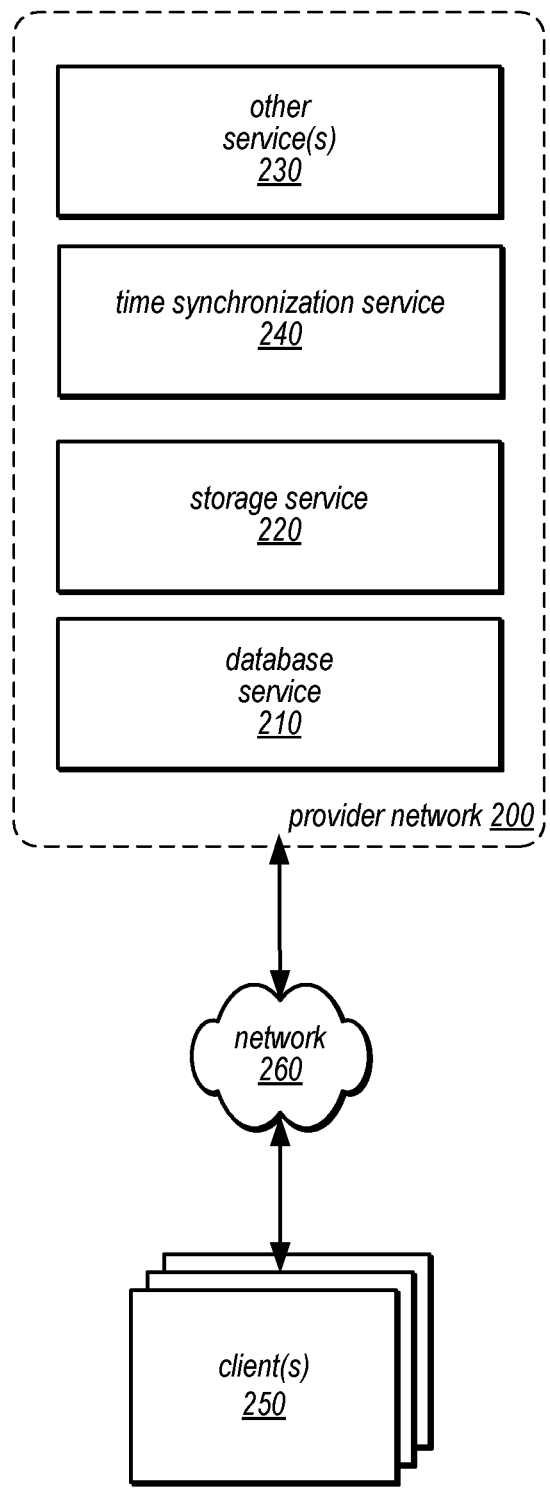
FIG. 2 is a block diagram illustrating a provider network that may implement a database service that supports both a client-managed table and system-managed table in a common database for which commit time logging for time-based multi-version concurrency control may be implemented, according to some embodiments.

FIG. 2 is a block diagram illustrating a provider network that may implement a database service that supports both a client-managed table and system-managed table in a common database for which commit time logging for time-based multi-version concurrency control may be implemented, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 3000 described below with regard to FIG. 12), needed to implement and distribute the infrastructure and storage services offered by the provider network within the provider network regions.

For example, provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, proxy service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, time synchronization service 240, storage service 220 and/or another service(s) 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
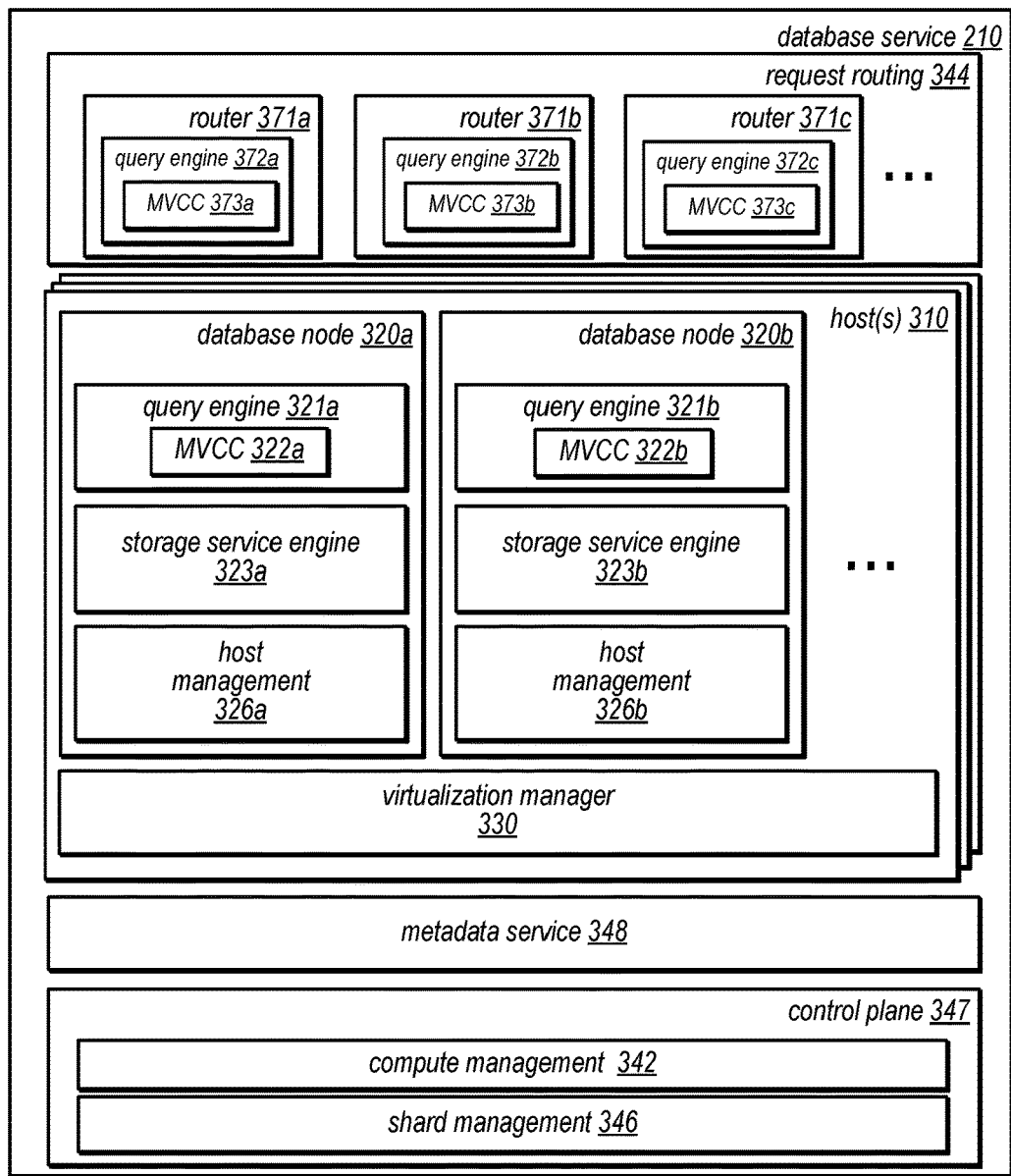
FIG. 3 is a block diagram illustrating various components of a database service and storage service that supports both a client-managed table and system-managed table in a common database, according to some embodiments.
Figure 3:
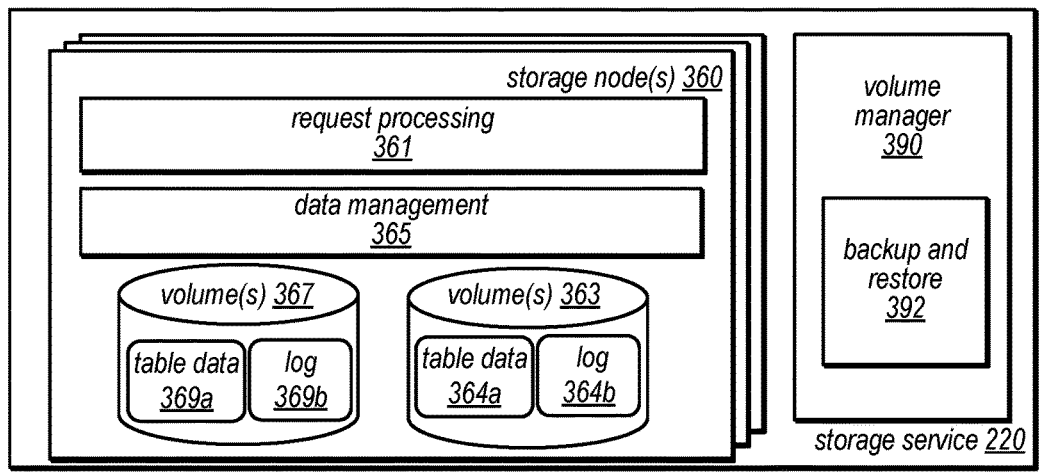

FIG. 3 is a block diagram illustrating various components of a database service and storage service that supports both a client-managed table and system-managed table in a common database, according to some embodiments. Database service 210 may implement control plane 347 which may manage the creation, provisioning, deletion, or other features of managing a database hosted in database service 210. For example, control plane 347 may monitor the performance of host(s) 310 (e.g., a computing system or device like computing system 3000 discussed below with regard to FIG. 12) via compute management 342 and shard management 346 (e.g., via heat management 341) for high workloads (e.g., heat) and move or shard assignments away from some hosts to avoid overburdening host(s) 310. Control plane 347 may handle various management requests, such as request to create databases, manage databases (e.g., by configuring or modifying performance, such as by enabling a "limitless table feature" or other automated management feature in response to a request which may cause in-place resource scaling to be enabled for that system-managed table. Control plane 347 may implement shard management 346 for system-managed tables to handle heat management 341, health monitoring 343 and placement management 345, as well as overall compute management 342 (e.g., also for client-managed tables).

Database service 210 may implement one or more different types of database systems with respective types of query engines for accessing database data as part of the database. In at least some embodiments, database service 210 may be a relational database service that hosts relational databases on behalf of clients. For example, database service 210 may implement various types of connection-based (e.g., having established a network connection between a database client and a router for an endpoint of a database which may route requests to various database nodes which may, for instance, facilitate the performance of various operations that continue over multiple communications between the database client and a connected router of a pool of routers 371a, 371b, 371c, and so on, of request routing 344 (or directly to a database node in some scenarios as discussed below with regard to FIG. 5). As discussed in detail below with regard to FIG. 7, in some embodiments routers 371a, 371b, and 371c may implement respective query engines 372a, 372b, and 372c, which may perform some (or all) of query, transaction, or other access request handling. Accordingly, these query engines may also implement time-based MVCC, as indicated at 373a, 373b, and 373c and may implement various portions of the techniques discussed above with regard to FIG. 1 and below with regard to FIGS. 8-10.

In some embodiments, pool of routers 371 may be assigned to a particular database, such that the combination of routers 371 and database nodes 320 may be considered a cluster. For example, when a client opens a client connection, the DNS (or NLB) will re-direct the physical socket connection to one of the routers 371. Since the routers 371 serve as the front end for all traffic, they may be implemented to be highly available. The routers may be similar to (e.g., run same engine binaries) to database nodes 310 and may, in some embodiments, host database tables (not illustrated). Each router 371 may be attached to one or more data stores to store metadata (and in some embodiments table data) and temporary tables or other temporary data that may need to be persisted locally. In some embodiments, a router 371 may be designated a router leader (e.g., one of a group of routers). The router leader will be the primary owner of system-managed table metadata. The router leader may also serve as the coordinator when necessary for operations that might require serialization. In some embodiments, routers 371 may be distributed across fault tolerance or other availability zones and may perform router failover (or router addition) in order to maintain high availability for a database to which the pool of routers are assigned.

Figure 5:
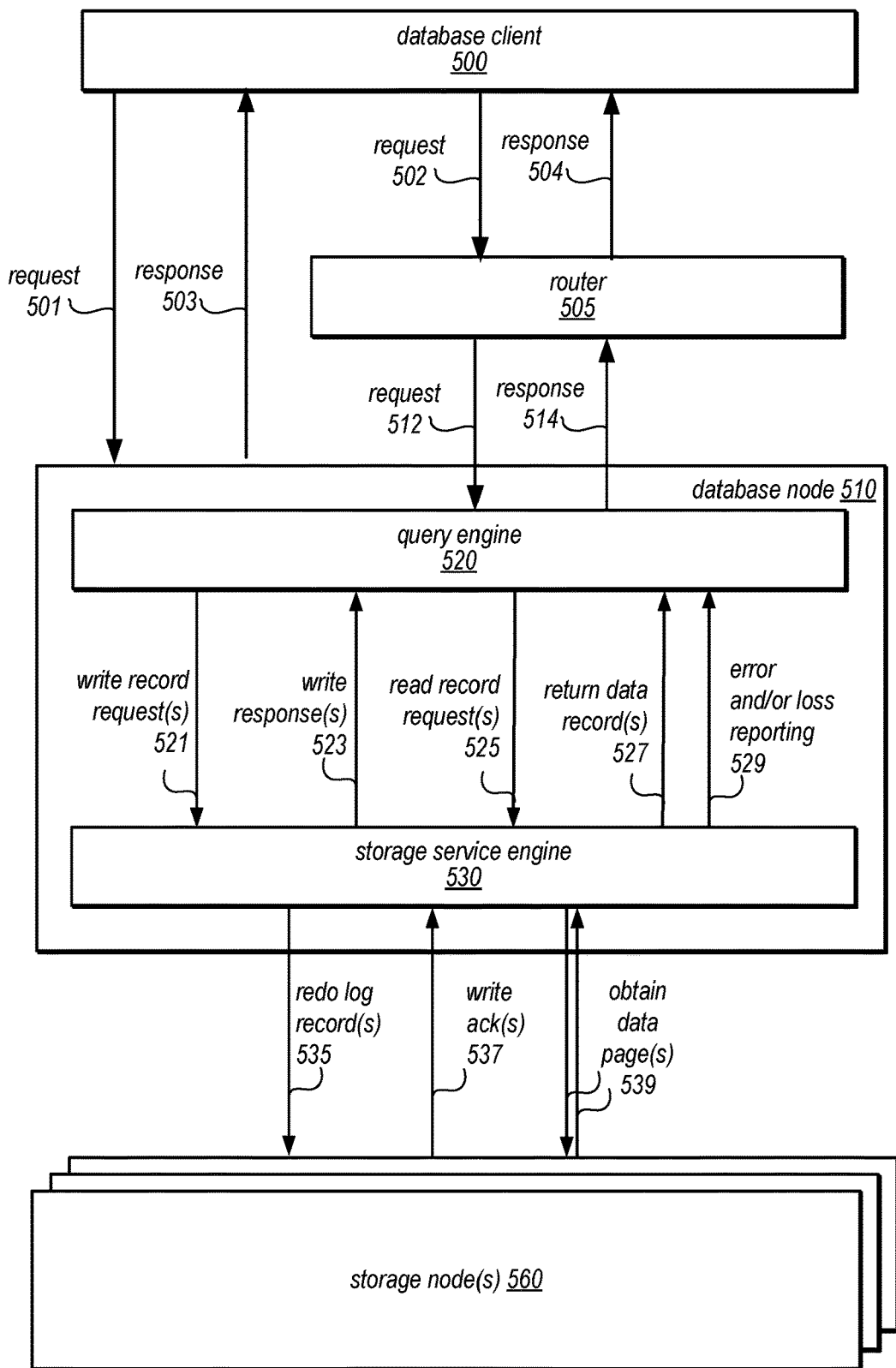
FIG. 5 is a block diagram illustrating various interactions to handle database client requests, according to some embodiments.
Figure 7:
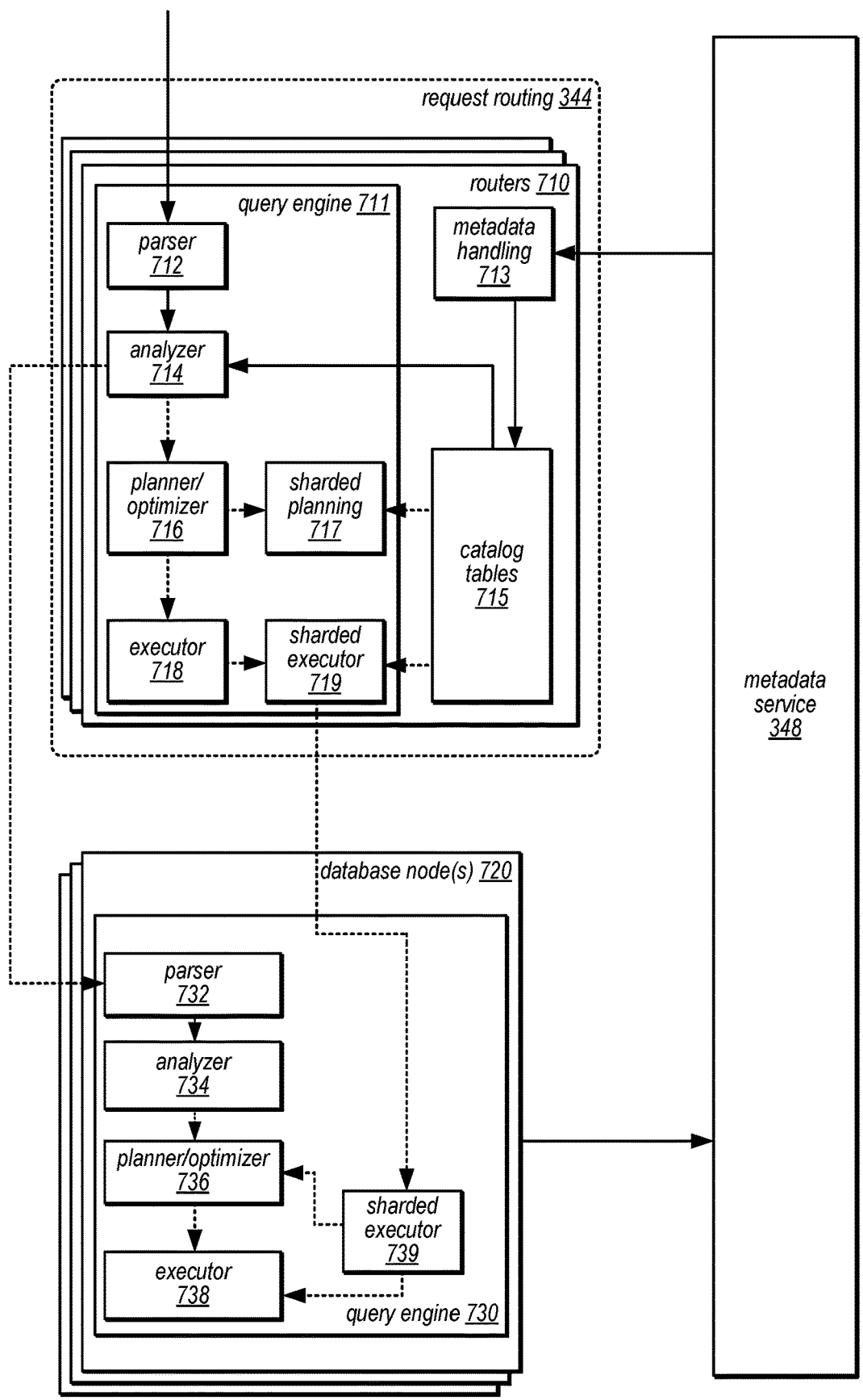
FIG. 7 is a logical block diagram illustrating a router that performs intelligent query routing across client-managed and system-managed tables, according to some embodiments.

In some embodiments, routers 371 may implement respective connection managers (not illustrated). As router nodes may mostly pull the data from database nodes for shards of a system-managed table (though not always as illustrated in some of the example distributed transaction techniques discussed below), in some embodiments, there may be a DB connection pool from every router 371 to every database node (e.g., for a database). However, reusing connections from one query engine (at a router as depicted in FIG. 7) to another (e.g., to a query engine implemented on a database node, also depicted in FIG. 7) cannot usually be done between users. In such scenarios, the connection manager may be responsible for cleaning up a database connection (with a client application as depicted in FIG. 5) after database session is closed (e.g., performing operations to clear data such as session configuration, user/role info, etc.) and starting processes, instances, or other components (e.g., pgBouncer instances for Postgres databases) for cases when new database nodes 320 and routers 371 nodes are added to a database with system-managed tables for a user as part of scale-out of database nodes or routers or recovery/replacement of existing database nodes or routers. When a new client application database connection to a router 371 needs to contact other nodes (e.g., router or a database node) it does so through foreign data wrapper (FDW) managed foreign server, which may be modified to contact a local connection manager for getting an available database connection at which moment the session context may be set based on an original database connection to a router. This may include session configuration (e.g., selective) and user/role info. With that, request routing 344 may ensure that access to remote objects respects privileges and as database nodes are computation nodes as well configuration is set (as it may not be common for FDW established connections which set just a user based on user mapping configured for a foreign server).

Database service 210 may implement a fleet of host(s) 310 which may provide, in various embodiments, a multi-tenant configuration so that different database nodes, such as database node 320*a* and 320*b*, can be hosted on the same host 310, but provide access to different databases on behalf of different clients over different connections. While hosts(s) 310 may be multi-tenant, each database node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database engine head node(s) 320) that were allocated to a database node 320 upon creation at host(s) 310.

Database node(s) 320 may support various features for accessing a database, such as query engine(s) 321*a* and 321*b*, including MVCCs 322*a* and 322*b* using time-based MVCC as discussed above with regard to FIG. 1 and below with regard to FIGS. 8-11, and storage service engine(s) 323*a* and 323*b* discussed in detail below with regard to FIGS. 5-7. Database nodes 320 may implement agents, interfaces, or other controls according to the respective type of virtualization used to collect and facilitate communication of utilization metrics for in-place scaling, among other supported aspects of virtualization, such as host management 326*a* and 326*b*. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement volume manager 390, which may implement various features including backup and restore 392.

For example, in some embodiments, data may be organized in various logical volumes, segments, and pages for storage on one or more storage nodes 360 of storage service 220. For example, in some embodiments, each database may be represented by a logical volume, such as logical volumes 367 and 363 (which may include both table data 369*a* and corresponding log(s) 369 (*b*) (e.g., redo logs). Table data 369*a* may be an entire table for a client-managed table or a shard of a system-managed table, as discussed in detail below. In some embodiments, volume(s) 363 may store metadata 364*a* for a database and a respective change log 364*b*. Each logical volume may be segmented over a collection of storage nodes 360. Each segment of a logical volume, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. Although not illustrated, volumes 367 may store a commit log (as illustrated above with regard to FIG. 1) as part of table data 364a and 369a, log 369b and 364b, or as its own data structure within volumes 367 and 363.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
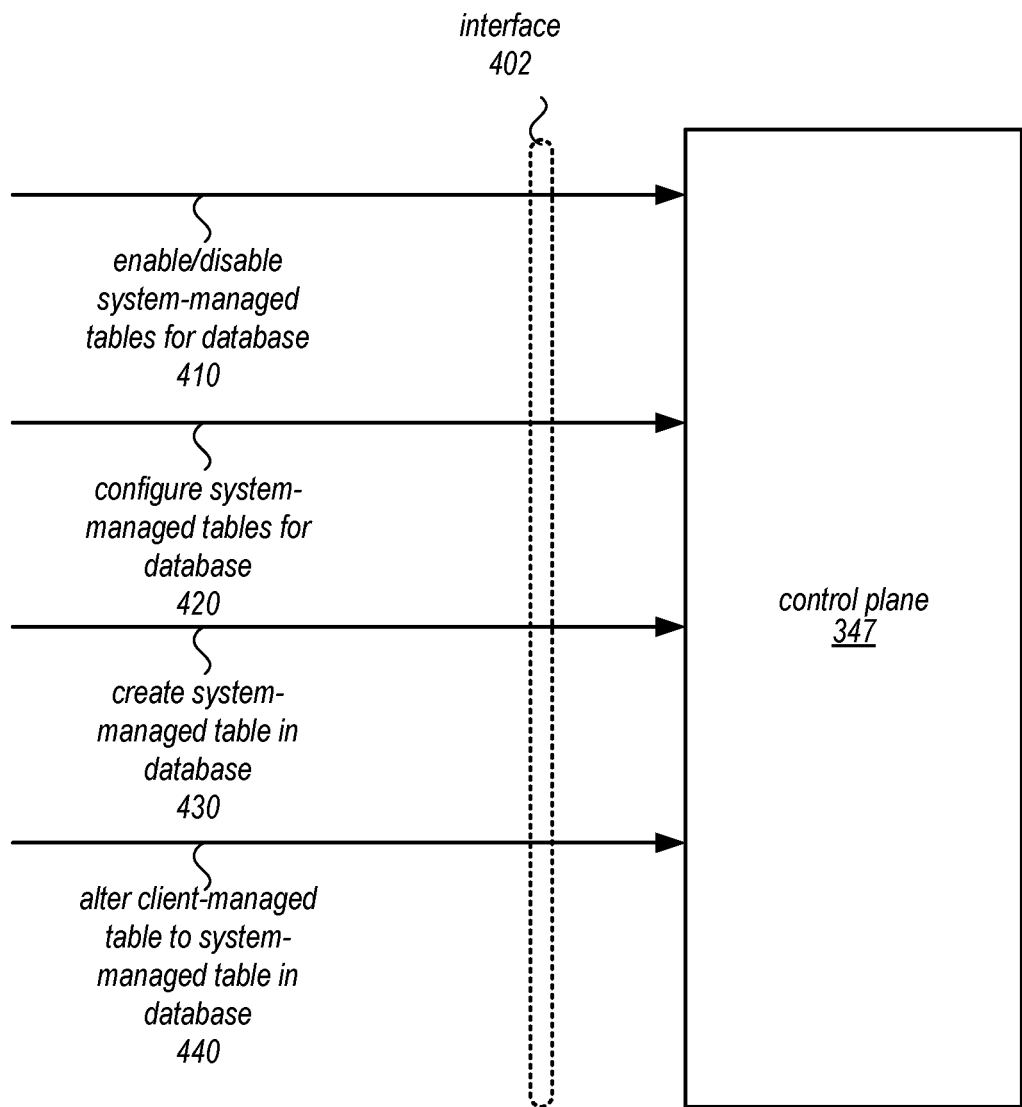
FIG. 4 is a block diagram illustrating various interactions to handle database client requests, according to some embodiments.

FIG. 4 illustrates interactions with a control plane of a database service for managing system-managed tables, according to some embodiments. Interface 402 may be a command line, programmatic (e.g., API), or graphical user interface for control plane 347. As indicated at 410, a request to enable or disable system-managed tables for a database may be received, in some embodiments. For example, the database may be identified (e.g., by identifier such as a number or resource number) along with the parameter set to enable or disable system-managed tables. In some embodiments, various system-management parameters, such as scaling limits for computing resources, including cost-based, resource-based, or other limitations, for instance as minimum and or maximum boundaries for scaling (or scaling within a period of time). As indicated at 420, these system-managed table parameters can be separately configured to add, remove, or change the parameters. In some embodiments, enabling system-managed tables may include parameters to configure the availability of the table across one (or more) availability zones.

Enabling system-managed tables may cause the creation of (or transfer of) a network endpoint (e.g., a network address) that is specific to the database to route requests to request routing 344 (which may assign or distribute the request to connect the database to different ones of routers 371 according to a load balancing scheme). In this way, connection requests to access the database (whether for a system-managed table or client-managed table) may be routed through request router 344 (e.g., instead of being routed directly to an existing database node already assigned to a current client-managed table of the database). These system-managed table parameters may be stored or updated in an administrative database and/or database metadata that is used to control database service 210 management of the database using various control plane features.

In some embodiments, control plane 347 may receive request to create a system-managed table in a database, as indicated at 430 or alter a client-managed table to a system managed table in the database, as indicated at 440. In some embodiments, these requests may be received at the database node for the database directly or at a router and thus may be received through the "data plane." These requests, however may then be forwarded or dispatched to control plane 347 to direct the operations to complete the requests.

Control plane 347 may perform the various operations to create or alter tables to system-managed tables. For example, aligned tables may be identified and stored across different shards, according to an initial placement hierarchy that may be determined for the system-managed table(s) (e.g., a default or standard hierarchy may be initially used and then modified overtime according various heat or operations). Various migration techniques may be used to move the existing table data to the appropriate shard or store, when received, new data into a table (e.g., as part of insert requests or batch updates to add table data). Control plane 347 may initialize or update metadata to identify the new (or altered) system-managed table so that routers may correctly identify and route requests to the appropriate database nodes. Control plane 347 may also provision or assign database nodes to shards of the system-managed table.

FIG. 5 is a block diagram illustrating various interactions to handle database client requests, according to some embodiments. In the example database system implemented as part of database service 210, a database engine head node 510 may be implemented for each database and storage nodes 560 (which may or may not be visible to the clients of the database system and may be similar to storage nodes 360 discussed above with regard to FIG. 3). Clients of a database may access a database node 510 directly in some embodiments (as indicated at request 501 and response 503 instead of through router 510, such as requests that are directed to client-managed tables) via network utilizing various database access protocols (e.g., Java Database Connectivity (JDBC) or Open Database Connectivity (ODBC)). However, storage nodes 560, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 560 may perform various storage, access, change logging, recovery, log record manipulation, and/or space management operations in a manner that is invisible to clients of a database node 510.

As previously noted, a database node 510 may implement query engine 520 and storage service engine 530, in some embodiments. Query engine 520 may receive requests, like request 512, which may include queries or other requests such as updates, deletions, etc., from a router 505 connected to a database client 500 which first received the request 502 from the database client 500. Implementing a router 505 between database client 500 and database node 510 may allow for database service 210 implement both client-managed tables and system-managed tables in the same database, as discussed in detail below. Query engine 520 then parses them, optimizes them, and develops a plan to carry out the associated database operation(s), as discussed in detail below with regard to FIG. 7.

Query engine 520 may return a response 514 to the request (e.g., results to a query) which router 505 may provide as response 504 to database client 500, which may include write acknowledgements, requested data (e.g., records or other results of a query), error messages, and or other responses, as appropriate. As illustrated in this example, database node 510 may also include a storage service engine 530 (or client-side driver), which may route read requests and/or redo log records to various storage nodes 560 within storage service 220, receive write acknowledgements from storage nodes 560, receive requested data pages from storage nodes 560, and/or return data pages, error messages, or other responses to query engine 520 (which may, in turn, return them to a database client).

In this example, query engine 520 or another database system management component implemented at database engine head node 510 (not illustrated) may manage a data page cache, in which data pages that were recently accessed may be temporarily held. Query engine 520 may be responsible for providing transactionality and consistency in the database of which database engine head node 510 is a component. For example, this component may be responsible for ensuring the Atomicity, Consistency, and Isolation properties of the database and the transactions that are directed that the database, as discussed in detail below with regard to FIGS. 8-11, such as determining a MVCC snapshot time of the database applicable for a query, applying undo log records to generate prior versions of tuples of a database. Query engine 520 may manage an undo log to track the status of various transactions and roll back any locally cached results of transactions that do not commit.

For example, a request 512 that includes a request to write to a page may be parsed and optimized to generate one or more write record requests 521, which may be sent to storage service engine 530 for subsequent routing to storage service nodes 560. In this example, storage service engine 530 may generate one or more redo log records 535 corresponding to each write record request 521, and may send them to specific ones of the storage nodes 560 of storage service 220. Storage nodes 560 may return a corresponding write acknowledgement 537 for each redo log record 535 (or batch of redo log records) to database node 510 (specifically to storage service engine 530). Storage service engine 530 may pass these write acknowledgements to query engine 520 (as write responses 523), which may then send corresponding responses (e.g., write acknowledgements) to one or more clients as a response 514.

In another example, a request that is a query may cause data pages to be read and returned to query engine 520 for evaluation. For example, a query could cause one or more read record requests 525, which may be sent to storage service engine 530 for subsequent routing to storage nodes 560. In this example, storage service engine 530 may send these requests to specific ones of the storage nodes 560, and storage nodes 560 may return the requested data pages 539 to database node 510 (specifically to storage service engine 530). Storage service engine 530 may send the returned data pages to query engine 520 as return data records 527, and query engine 520 may then evaluate the content of the data pages in order to determine or generate a result of a query sent as a response 514.

In some embodiments, various error and/or data loss messages 541 may be sent from log-structured storage service 550 to database node 510 (specifically to storage service engine 530). These messages may be passed from storage service engine 530 to query engine 520 as error and/or loss reporting messages 529, and then to one or more clients as a response 514.

In some embodiments, the APIs 535-539 to access storage nodes 560 and the APIs 521-529 of storage service engine 530 may expose the functionality of storage service 220 to database node 510 as if database node 510 were a client of storage service 220. For example, database node 510 (through storage service engine 530) may write redo log records or request data pages through these APIs to perform (or facilitate the performance of) various operations of the database system implemented by the combination of database node 510 and storage nodes 560 (e.g., storage, access, change logging, recovery, and/or space management operations).

Note that in various embodiments, the API calls and responses between database node 510 and storage nodes 560 (e.g., APIs 521-529) and/or the API calls and responses between storage service engine 530 and query engine 520 (e.g., APIs 535-539) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database node 510 and/or storage nodes 560.

Figure 6:
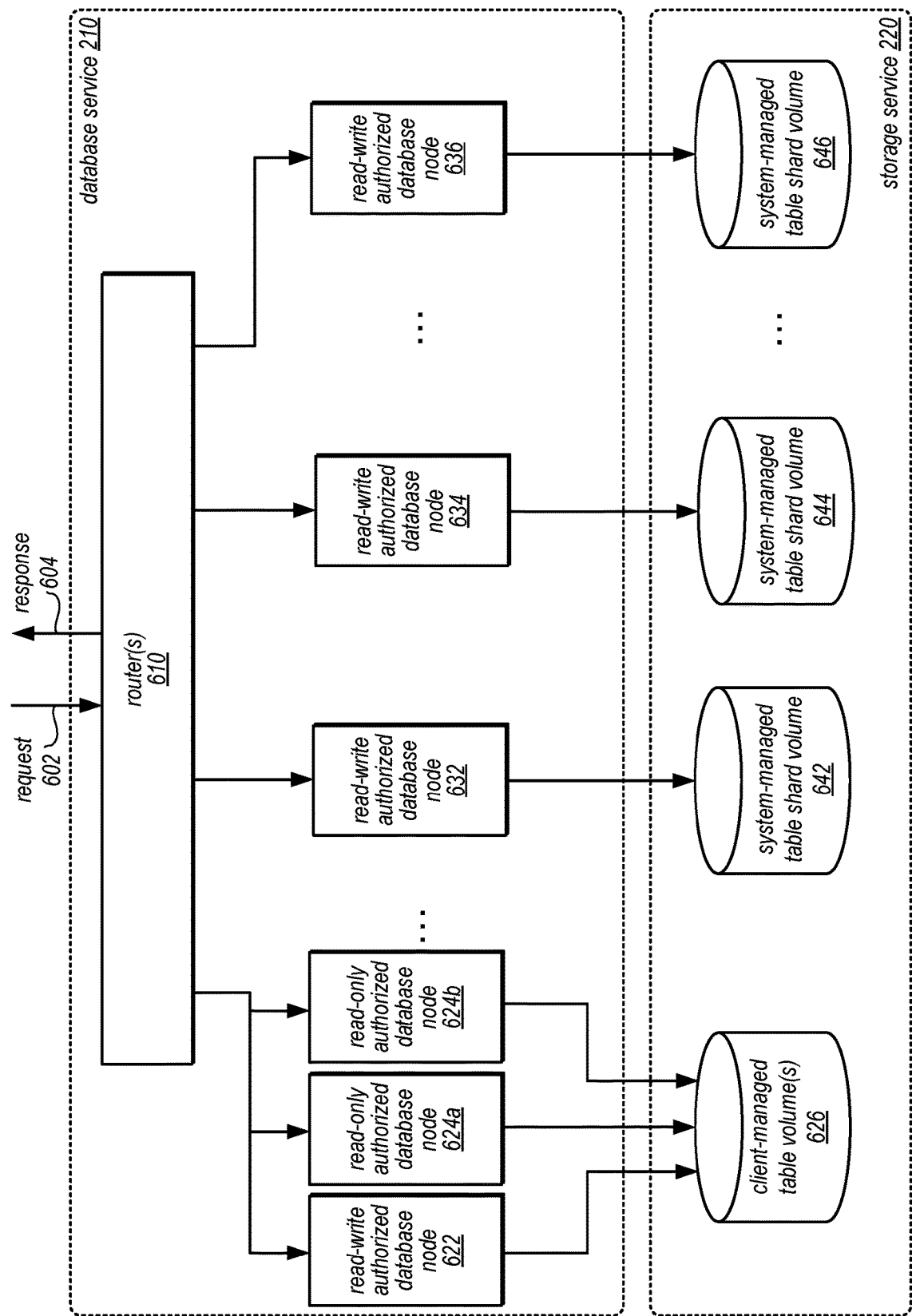
FIG. 6 is a logical block diagram illustrating interactions for a database that includes both a client-managed table and a system-managed table, according to some embodiments.

FIG. 6 is a logical block diagram illustrating interactions for a database that includes both a client-managed table and a system-managed table. Request 602 may be received at one of many routers 610 that are implemented as part of database service 210, as discussed above with regard to FIG. 3. A router 610 may accept the request and direct it to the appropriate database nodes using both the query planning location selection techniques and, if a transaction, commit protocol techniques, discussed below with regard to FIG. 7. A client-managed table may be stored in a client-managed table volume 626 which may be connected to assigned database nodes, such as read-write authorized database node 622. In some embodiments, read-only nodes 624a and 624b, can also be assigned to increase read capacity. As discussed above with regard to FIG. 5, database node 622 can request data pages, send redo log records, and otherwise interact with client-managed table volumes for portions of access requests targeted to client-managed tables.

For a system-managed table, multiple shards may be determined assigned to different read-write database nodes 632, 634, and 636 respectively for shards stored in volumes 642, 644, and 646. Although not illustrated, read-only nodes may also be assigned to shards in order to satisfy the workload requirements on system-managed tables. The number of assigned database nodes and shards for a system-managed table may change over time as additional compute or storage capacity is needed. These changes may be determined automatically by database service 210 (e.g., via heat management 342).

FIG. 7 is a logical block diagram illustrating a router that performs intelligent query routing across client-managed and system-managed tables, according to some embodiments. Routers 710 may implement a query engine 711. When an access request is received, query engine 711 may parse the request at parser 712 and analyze the request at analyzer 714 to determine which shards or client-managed tables should be accessed to perform the access request according to catalog tables 715, which may be synchronized using metadata service 348 to obtain up-to-date shard, database node, and other assignments for tables in the database. Then, according to the analysis 714 different planning location(s) and execution paths (illustrated by the dotted line paths) may result. For example, network I/O minimization may be used to select between different distributed execution plans for access requests, in some embodiments.

For example, for router-selected planning, planner/optimizer 716 may generate a query plan and pass the plan off to sharded planning 717, which may add features to aggregate results from multiple database nodes at shards (and also a client-managed table if included in a request with one or more shards). The sharded plan may then be passed to executor 718 which may provide instructions to sharded executor 719 to perform at database node(s) 720. Database nodes 720 may perform different requests according to different execution paths (e.g., receiving subsets of plans for further planning/optimization 736 and then execution through sharded executor 739, or straight to executor 738 via sharded executor 739). Alternatively, when a database node is involved in performing a request (e.g., at only one database node), then the request may be sent for parsing 732, analysis 734, planning/optimization 736, and optimization 738. Although not depicted results may be returned from the database node(s) 720 to router 710 to return to a client (as depicted in FIG. 5).

Updates that are caused to metadata (e.g., changes to database schemas by Data Definition Language (DDL) requests or modifications to client-managed tables that are replicated), may be reported through metadata service 348.

The database service and storage service discussed in FIGS. 2 through 7 provide examples of a database system that may implement client-managed tables and system-managed tables in a database which also implement commit time logging for time-based multi-version concurrency control. However, various other types of database systems may make use of commit time logging for time-based multi-version concurrency control.

Figure 8:
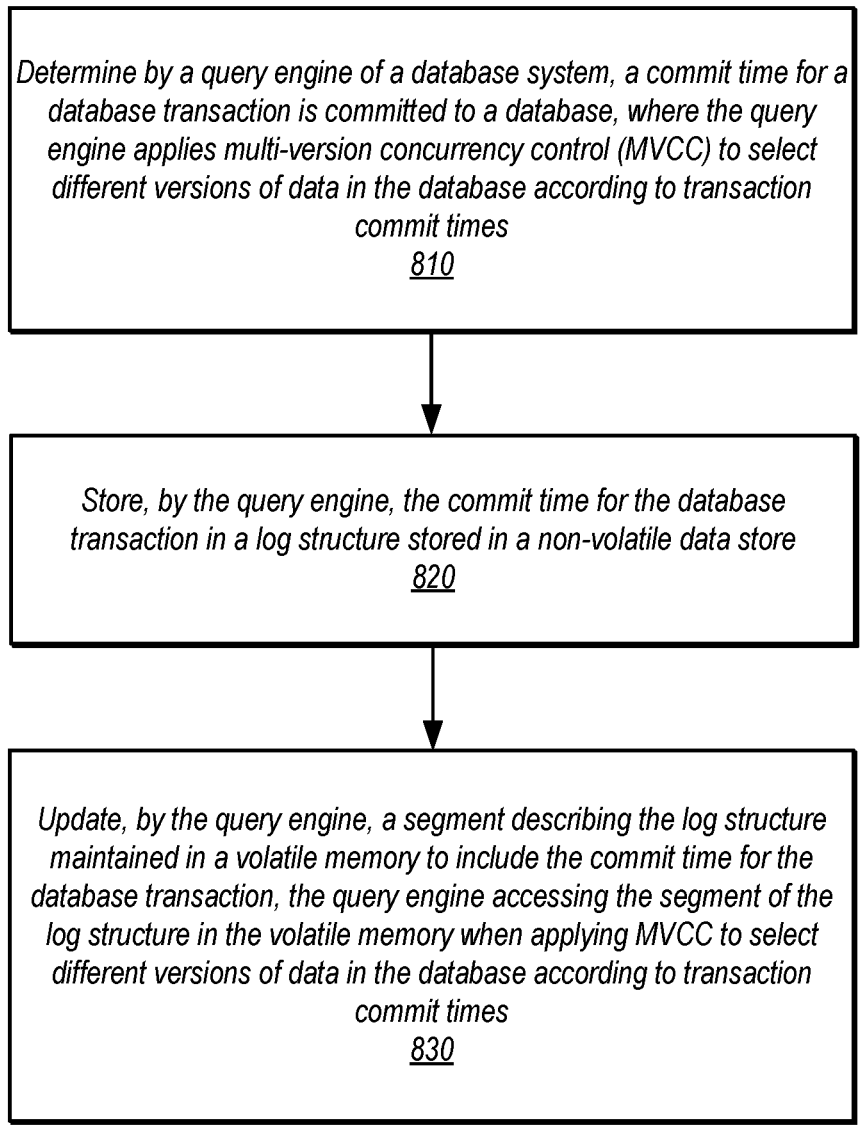
FIG. 8 is a high-level flowchart illustrating various methods and techniques to implement commit time logging for time-based multi-version concurrency control, according to some embodiments.

FIG. 8 is a high-level flowchart illustrating various methods and techniques to implement commit time logging for time-based multi-version concurrency control, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 810, a query engine of a database system may determine a commit time for a database transaction is committed to a database, where the query engine applies multi-version concurrency control (MVCC) to select different versions of data in the database according to transaction commit times, in some embodiments. For example, a query engine may utilize a system clock time, which may be a local clock time or a globally, synchronized clock time according to a time synchronization service (e.g., time synchronization service 240 in FIG. 2). The time may be determined according to when the database transaction commits (e.g., is determined to succeed and be durably stored/persisted by the database system).

As indicated at 820, the query engine may store the commit time for the database transaction in a log structure stored in a non-volatile data store, in some embodiments. In some embodiments, the log structure may utilize the same format as the format in volatile memory (as depicted in FIG. 1), where a segment corresponding to the database transaction is identified (e.g., is open or has capacity for storing new database transactions). A request to a remote data store (e.g., from a query engine at a request router or database node to a storage node) or a request to a directly attached storage device (e.g., over a peripheral device connection on a host system) may be made. The request may include the commit time and an identifier for the database transaction (e.g., which may be assigned by the query engine using a monotonically increasing or other scheme that ensures unique database transaction identifiers). The database transaction identifier may be used to create and store the commit time in a corresponding data structure in the log structure (e.g., in a transaction array as depicted in FIG. 1).

As indicated at 830, the query engine may update a segment describing the log structure maintained in a volatile memory to include the commit time for the database transaction, the query engine accessing the segment of the log structure in the volatile memory when applying MVCC to select different versions of data in the database according to transaction commit times, in some embodiments. For example, as depicted in FIG. 1, an open (or current) segment for the database transaction may be identified. A data structure, such as a transaction array, may be updated to include the commit time of the database transaction (e.g., by using the transaction identifier of the database to determine an index value). Other information may be updated as part of updating the segment. For example, the min or max time of the segment may be updated if the database transaction has an earlier or later commit time than the current min or max time of the segment.

Figure 9:
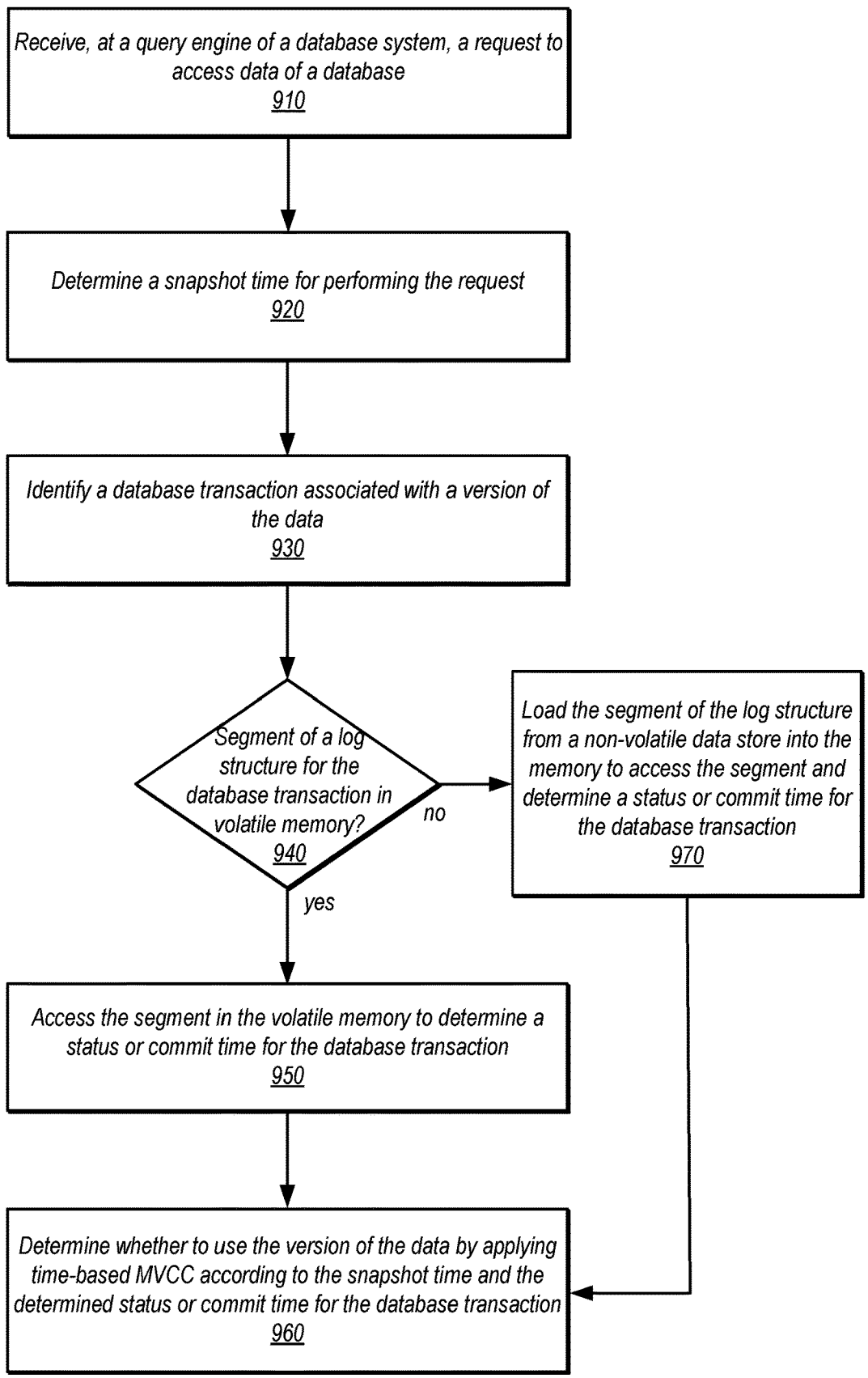
FIG. 9 is a high-level flowchart illustrating various methods and techniques to implement access a segment of a commit log to perform time-based MVCC, according to some embodiments.

Once stored, the commit log may be used to implement time-based MVCC in order to provide concurrent access at the database system when performing access requests. FIG. 9 is a high-level flowchart illustrating various methods and techniques to implement access a segment of a commit log to perform time-based MVCC, according to some embodiments. As indicated at 910, a query engine may receive a request to access data of a database, in some embodiments. The access request may be a query or other request that causes a read of the database. In some embodiments, the access request may be an insert or other request that causes a write to the database. In some embodiments, the access request may be received as part of a transaction that has been started at the database.

As indicated at 920, the query engine may determine a snapshot time for performing the request, in some embodiments. The snapshot time, similar to the commit time, may be determined utilizing a system clock time, which may be a local clock time or a globally, synchronized clock time according to a time synchronization service (e.g., time synchronization service 240 in FIG. 2). The snapshot time may correspond to a time at which the access request is received.

As indicated at 930, a database transaction may be identified that is associated with a version of the data, in some embodiments. For example, as part of performing the access request, different portions of database data (e.g., pages) may be identified that should be accessed. Each of these portions may have associated metadata which indicates whether or not the portion of data has an associated database transaction (e.g., by a time value, such as time for a last update (e.g., write) to the portion of the data.

As indicated at 940, a determination may be made as to whether a segment of the log structure describing the database transaction is stored in volatile memory, in some embodiments. If yes, then the segment may be accessed in the volatile memory to determine a status or commit time for the database transaction, in some embodiments, as indicated at 950. If no, then as indicated at 960, the segment of the log structure that the describes the database transaction may be loaded from the non-volatile data store into the memory to determine a status or commit time for the database transaction, in some embodiments.

As indicated at 960, a determination may be made as to whether to use the version of the data by applying time-based MVCC according to the snapshot time and the determined status or commit time for the database transaction, in some embodiments. For example, if the transaction is determined to be committed prior to the snapshot time (or the database transaction status is stored as committed), then the version of the data may be used. If, however, the commit time is later than the snapshot time or the status is indicated as not committed, then a different version (e.g., an earlier version) of the data may be used.

Figure 10:
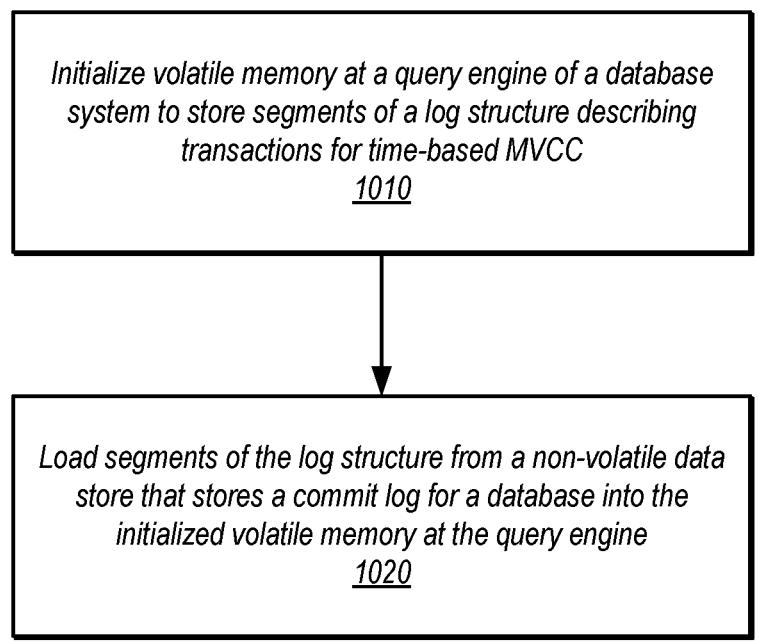
FIG. 10 is a high-level flowchart illustrating various methods and techniques to implement loading segments of a commit log into volatile memory for a query engine, according to some embodiments.

Because the commit log is stored in persistent storage, in addition to volatile memory, the commit log can be loaded into the volatile memory in various scenarios (e.g., startup of a new database node, restart of a failed database node, resume of a paused database node, etc.). FIG. 10 is a high-level flowchart illustrating various methods and techniques to implement loading segments of a commit log into volatile memory for a query engine, according to some embodiments. As indicated at 1010, volatile memory may be initialized at a query engine of a database system to store segments of a log structure describing transactions for time-based MVCC, in some embodiments. For example, the various metadata structures that are used to identify appropriate segments, such as mapping or other location information that describes the location of different segments in a memory may be initialized as may be locations for segment-specific metadata (e.g., minimum and maximum commit times).

As indicated at 1020, one or more segments of the log structure may be loaded from a non-volatile data store that stores a commit log for a database into the initialized volatile memory at the query engine, in some embodiments. A limit on the number of segments may be enforced (e.g., segments may be loaded until the limit on the number or amount of memory used for segments is reached). Segments may be loaded in an order starting from a most recent segment (e.g., with a highest maximum commit time), in some embodiments. When segments are loaded, the metadata for segments may be initialized (e.g., by reading the commit times of database transactions stored in the segment to initialize the minimum and maximum commit times).

Figure 11:
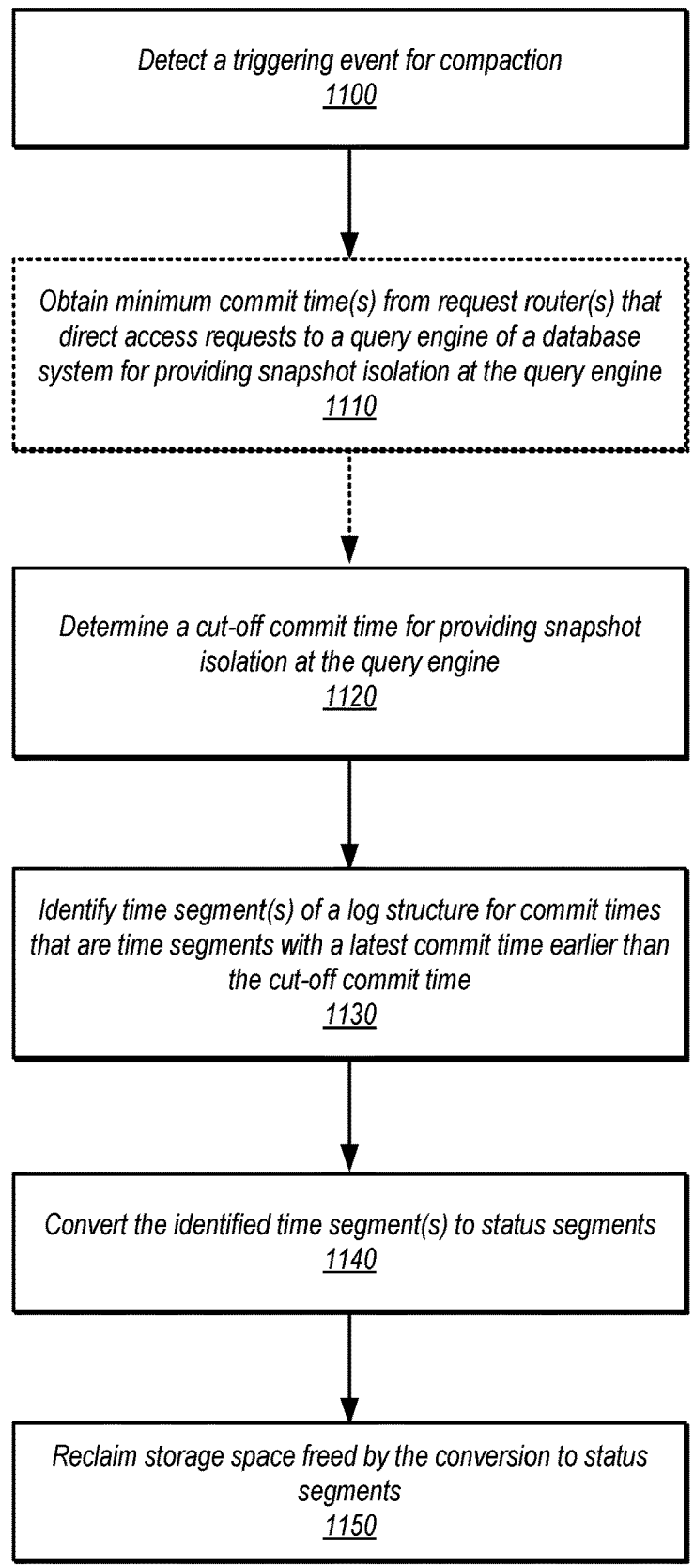
FIG. 11 is a high-level flowchart illustrating various methods and techniques to implement compacting segments of a commit log, according to some embodiments.

As discussed above with regard to FIG. 1, there may be different types of segments. Switching between segment types may free up storage space (e.g., in volatile memory and non-volatile storage) as some segment types (e.g., status segment types) may be utilize less storage space than others (e.g., time segment types). Compaction techniques may be applied in order to change between segment types. FIG. 11 is a high-level flowchart illustrating various methods and techniques to implement compacting segments of a commit log, according to some embodiments.

As indicated at 1100, a compaction event may be detected, in some embodiments. Compaction events may be detected by evaluating for different criteria. For example, compaction events may be used to dynamically (and proactively) change the composition of segment types in volatile memory in order to prevent a query engine from having to load a segment from non-volatile storage (as depicted in FIG. 9). In some embodiments, a memory pressure measure or metric may be determined (e.g., signaled by another component of the database system that finds a less than desired amount of free memory available for performing different tasks, such as query result processing or index management or as a measure of free memory available to the query engine). For example, a node can determine when to force compact segments. To decide when to compact will may be based on total memory available on this node. There may be two events when a node will decide to perform force compaction. One event is steady state. Steady state may be determined based on available memory (say M) on this node. The node will compute total time segment threshold to compact (threshold_at_steady)=floor ((M*(X/100))/(size of time segment)), where X is % memory used by segments.

Another event is boot time. Boot time may be based on available memory (say M) on this node. The node will compute total time segment threshold to compact (threshold_at_boot)=floor ((M*(Y/100))/(size of timesegment)). A log scan may be performed, counting how may time segments there are (say total_time_segment_on_storage) if total_time_segment_on_storage>=threshold_at_boot, then perform force compaction.

In some embodiments, such as the distributed database system depicted in FIGS. 2-7, multiple components may be utilizing or determining commit times. Request routers as discussed above, for example, may perform some database transactions in conjunction with (or instead of) database nodes. In such embodiments, as indicated at 1110, minimum commit time(s) may be obtained from request router(s) that direct access requests to a query engine of a database system for providing snapshot isolation at the query engine, in some embodiments. For other database system architectures, the commit times may be obtained from other participants (or this feature may not need to be performed).

As indicated at 1120, a cut-off commit time for providing snapshot isolation at the query engine may be determined, in some embodiments. For example, the cut-off commit time may represent a commit time after which any attempt to assign a database transaction a commit time later than the cut-off commit time will cause that database transaction to fail. In this way, subsequent database transactions may not disrupt the compaction process.

As indicated at 1130, segment(s) of a log structure for commit times that are time segments with a latest commit time earlier that the cut-off commit time may be identified, in some embodiments. For example, the maximum commit times of each segment may be evaluated and compared with the cut-off commit time.

As indicated at 1140, the identified time segment(s) may be converted to status segments, in some embodiments. For example, in various embodiments, time segments may store time values for the commit times of each database transaction in the segment. For status segments, a database transaction status (e.g., in-progress, aborted, committed, committing) may be recorded. When converting, the status of the transaction may be recorded only. The commit time may no longer be recorded.

As indicated at 1150, storage space created by the conversion to status segments may be reclaimed, in some embodiments. For example, allocation maps may be updated, memory free operations may be performed, or various techniques that can make the reclaimed storage space available be performed.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 12:
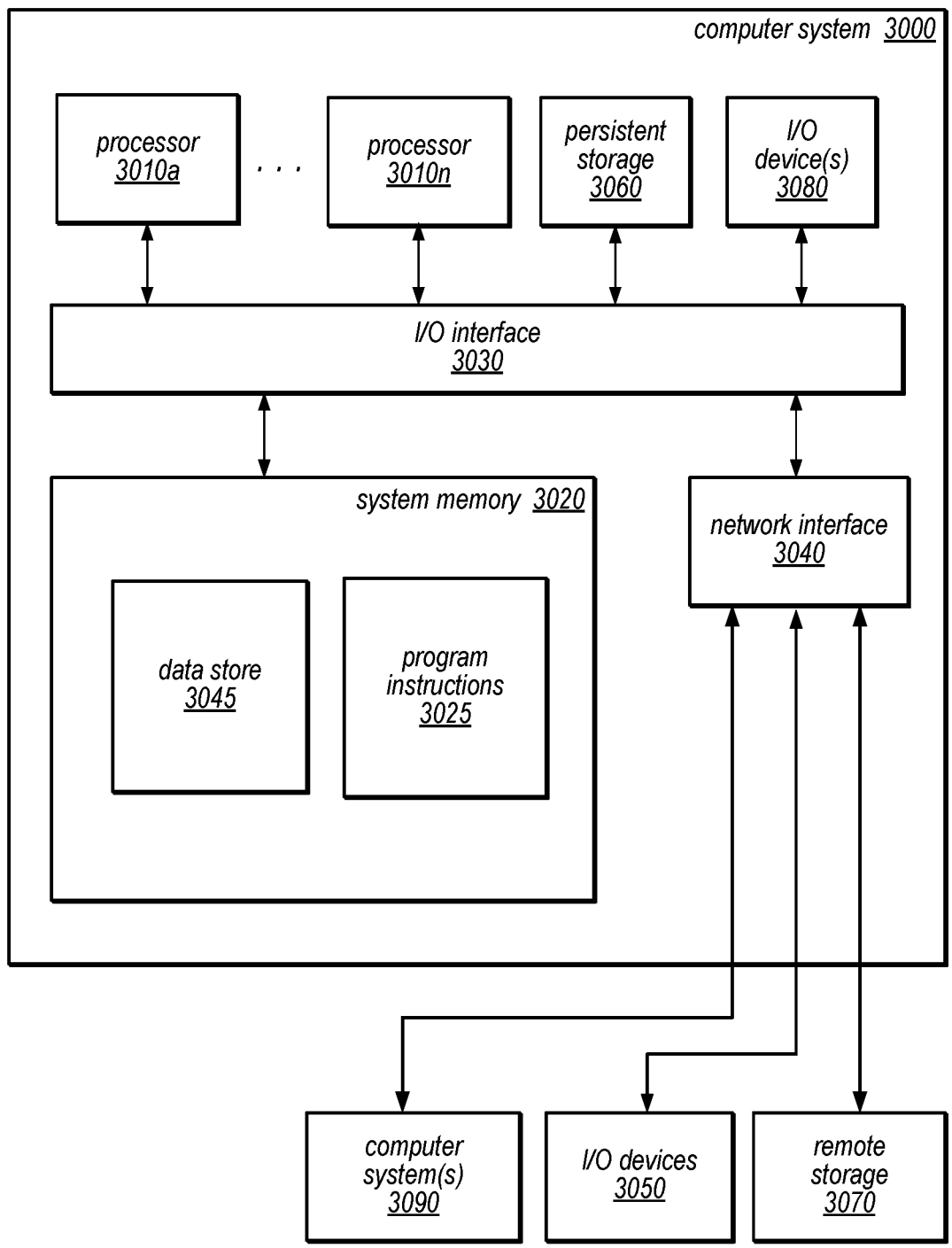
FIG. 12 is a block diagram illustrating an example computer system, according to various embodiments.

FIG. 12 is a block diagram illustrating an example computer system that may implement the various techniques of commit time logging for time-based multi-version concurrency control discussed above with regard to FIGS. 1-11, according to various embodiments described herein. For example, computer system 3000 may implement a data processing node, router, and/or a storage node of a separate storage system that stores database tables and associated metadata on behalf of clients of the database tier, in various embodiments. Computer system 3000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 3000 includes one or more processors 3010 (any of which may include multiple cores, which may be single or multi-threaded) coupled to a system memory 3020 via an input/output (I/O) interface 3030. Computer system 3000 further includes a network interface 3040 coupled to I/O interface 3030. In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. The computer system 3000 also includes one or more network communication devices (e.g., network interface 3040) for communicating with other systems and/or components over a communications network (e.g. Internet, LAN, etc.). For example, a client application executing on system 3000 may use network interface 3040 to communicate with a server application executing on a single server or on a cluster of servers that implement one or more of the components of the database systems described herein. In another example, an instance of a server application executing on computer system 3000 may use network interface 3040 to communicate with other instances of the server application (or another server application) that may be implemented on other computer systems (e.g., computer systems 3090).

In the illustrated embodiment, computer system 3000 also includes one or more persistent storage devices 3060 and/or one or more I/O devices 3080. In various embodiments, persistent storage devices 3060 may correspond to disk drives, tape drives, solid state memory, other mass storage devices, or any other persistent storage device. Computer system 3000 (or a distributed application or operating system operating thereon) may store instructions and/or data in persistent storage devices 3060, as desired, and may retrieve the stored instruction and/or data as needed. For example, in some embodiments, computer system 3000 may host a storage system server node, and persistent storage 3060 may include the SSDs attached to that server node.

Computer system 3000 includes one or more system memories 3020 that may store instructions and data accessible by processor(s) 3010. In various embodiments, system memories 3020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 3020 may contain program instructions 3025 that are executable by processor(s) 3010 to implement the methods and techniques described herein (e.g., various features of fine-grained virtualization resource provisioning for in-place database scaling). In various embodiments, program instructions 3025 may be encoded in native binary, any interpreted language such as Java™ byte-code, or in any other language such as C/C++, Java™, etc., or in any combination thereof. In some embodiments, program instructions 3025 may implement multiple separate clients, server nodes, and/or other components.

In some embodiments, program instructions 3025 may include instructions executable to implement an operating system (not shown), which may be any of various operating systems, such as UNIX, LINUX, Solaris™, MacOS™, Windows™, etc. Any or all of program instructions 3025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 3040.

In some embodiments, system memory 3020 may include data store 3045, which may be configured as described herein. For example, the information described herein as being stored by the database tier (e.g., on a primary node), such as a transaction log, an undo log, cached page data, or other information used in performing the functions of the database tiers described herein may be stored in data store 3045 or in another portion of system memory 3020 on one or more nodes, in persistent storage 3060, and/or on one or more remote storage devices 3070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 3045 or in another portion of system memory 3020 on one or more nodes, in persistent storage 3060, and/or on one or more remote storage devices 3070, at different times and in various embodiments. Similarly, the information described herein as being stored by the storage tier (e.g., redo log records, data pages, data records, and/or other information used in performing the functions of the distributed storage systems described herein) may be stored in data store 3045 or in another portion of system memory 3020 on one or more nodes, in persistent storage 3060, and/or on one or more remote storage devices 3070, at different times and in various embodiments. In general, system memory 3020 (e.g., data store 3045 within system memory 3020), persistent storage 3060, and/or remote storage 3070 may store data blocks, replicas of data blocks, metadata associated with data blocks and/or their state, database configuration information, and/or any other information usable in implementing the methods and techniques described herein.

In one embodiment, I/O interface 3030 may coordinate I/O traffic between processor 3010, system memory 3020 and any peripheral devices in the system, including through network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments, some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems 3090 (which may implement one or more storage system server nodes, primary nodes, read-only node nodes, and/or clients of the database systems described herein), for example. In addition, network interface 3040 may allow communication between computer system 3000 and various I/O devices 3050 and/or remote storage 3070. Input/output devices 3050 may, in some embodiments, include one or more display terminals, keyboards, keypads, touchpads, scanning devices, voice or optical recognition devices, or any other devices suitable for entering or retrieving data by one or more computer systems 3000. Multiple input/output devices 3050 may be present in computer system 3000 or may be distributed on various nodes of a distributed system that includes computer system 3000. In some embodiments, similar input/output devices may be separate from computer system 3000 and may interact with one or more nodes of a distributed system that includes computer system 3000 through a wired or wireless connection, such as over network interface 3040. Network interface 3040 may commonly support one or more wireless networking protocols (e.g., Wi-Fi/IEEE 802.11, or another wireless networking standard). However, in various embodiments, network interface 3040 may support communication via any suitable wired or wireless general data networks, such as other types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol. In various embodiments, computer system 3000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a query engine for a database system, wherein the query engine is configured to:
      assign a commit time for a database transaction determined to be committed to a database, wherein the query engine applies multi-version concurrency control (MVCC) to select different versions of data in the database according to transaction commit times;
      update a segment of a commit log maintained in a non-volatile data store to include the commit time of the database transaction; and
      update a corresponding segment of the commit log maintained in a volatile memory to include the commit time for the database transaction, wherein the corresponding segment of the commit log is maintained in the volatile memory in a same format as the segment of the commit log maintained in the non-volatile data store, wherein the query engine accesses the segment of the commit log in the volatile memory when applying MVCC to select different versions of data in the database according to transaction commit times.

2. The system of claim 1, wherein the query engine is further configured to:
   receive a request to access the data of the database;
   determine a snapshot time for performing the request to access the data of the database;
   identify an associated database transaction for one of the versions of the data of the database;
   determine that the segment in the volatile memory describes the associated database transaction;
   access the segment to determine a status or commit time for the associated database transaction; and
   determine to use the version of the data by applying time-based MVCC according to the snapshot time and the determined status or commit time for the associated database transaction.

3. The system of claim 1, wherein the query engine is further configured to:
   determine a cut-off commit time for providing snapshot isolation at the query engine;
   identify one or more time segments of the commit log stored in the volatile memory with a latest commit time earlier than the cut-off commit time;
   convert the identified one or more time segments of the commit log to one or more status segments of the commit log; and
   reclaim storage space in the volatile memory freed by the conversion to the one or more status segments.

4. The system of claim 1, wherein the database system is a database service implemented as part of a provider network and wherein the data of the database and the non-volatile data store are implemented as part of a storage service implemented as part of the provider network.

5. A method, comprising:
   determining, by a query engine of a database system, a commit time for a database transaction is committed to a database, wherein the query engine applies multi-version concurrency control (MVCC) to select different versions of data in the database according to transaction commit times;
   storing, by the query engine, the commit time for the database transaction in a log structure stored in a non-volatile data store; and
   updating, by the query engine, a segment describing the log structure maintained in a volatile memory to include the commit time for the database transaction, wherein the segment describing the log structure is maintained in the volatile memory in a same format as the log structured stored in the non-volatile data store, wherein the query engine accesses the segment of the log structure in the volatile memory when applying MVCC to select different versions of data in the database according to transaction commit times.

6. The method of claim 5, further comprising:
   receiving, by the query engine, a request to access the data of the database;
   determining, by the query engine, a snapshot time for performing the request to access the data of the database;

identifying, by the query engine, an associated database transaction for one of the versions of the data of the database;

determining, by the query engine, that the segment in the volatile memory describes the associated database transaction;

accessing, by the query engine, the segment to determine a status or commit time for the associated database transaction; and determining, by the query engine, to use the version of the data by applying time-based MVCC according to the snapshot time and the determined status or commit time for the associated database transaction.

7. The method of claim 5, further comprising:
receiving, by the query engine, a request to access the data of the database;
determining, by the query engine, a snapshot time for performing the request to access the data of the database;
identifying, by the query engine, an associated database transaction for one of the versions of the data of the database;
determining, by the query engine, that associated database transaction is not described by one or more segments, including the segment, in the volatile memory;
loading, by the query engine, a different segment from the non-volatile data store that describes the associated database transaction into the volatile memory;
determining, by the query engine, a status or commit time for the associated database transaction from accessing the different segment; and
determining, by the query engine, to use the one version of the data by applying time-based MVCC according to the snapshot time and the determined status or commit time for the associated database transaction.

8. The method of claim 5, further comprising:
initializing, by the query engine, the volatile memory to store one or more segments of the log structure; and
loading, by the query engine, the one or more segments of the log structure from the non-volatile data store into the initialized volatile memory.

9. The method of claim 5, further comprising:
determining, by the query engine, a cut-off commit time for providing snapshot isolation at the query engine;
identifying, by the query engine, one or more time segments stored in the volatile memory with a latest commit time earlier than the cut-off commit time;
converting, by the query engine, the identified one or more time segments to one or more status segments of the commit log; and
reclaiming, by the query engine, storage space in the volatile memory freed by the conversion to the one or more status segments.

10. The method of claim 9, further comprising:
detecting, by the query engine, a compaction event for the one or more time segments stored in the volatile memory, based, at least in part, on a memory pressure determination for the volatile memory; and
aborting, by the query engine, one or more in-flight database transactions.

11. The method of claim 9, further comprising obtaining, by the query engine, respective minimum commit times from one or more request routers that send access requests to the query engine for the database, wherein the cut-off commit time is determined based on an earliest one of the respective minimum commit times.

12. The method of claim 5, further comprising:
determining, by the query engine, a cut-off commit time for providing snapshot isolation at the query engine;
causing, by the query engine:
identification of one or more time segments stored in the non-volatile data store with a latest commit time earlier than the cut-off commit time;
conversion of the identified one or more time segments to one or more status segments of the commit log; and
reclamation of storage space in the non-volatile data store freed by the conversion to the one or more status segments.

13. The method of claim 5, wherein time-based MVCC is enabled for the query engine according to a request received at the database system.

14. One or more non-transitory, computer-readable storage media, storing program instructions that when executed on or across one or more computing devices cause the one or more computing devices to implement a query engine for a database system that implements:
assigning a commit time for a database transaction determined to be committed to a database, wherein the query engine applies multi-version concurrency control (MVCC) to select different versions of data in the database according to transaction commit times;
storing the commit time for the database transaction in a log structure stored in a non-volatile data store; and
updating a segment describing the log structure maintained in a volatile memory to include the commit time for the database transaction, wherein the segment describing the log structure is maintained in the volatile memory in a same format as the log structured stored in the non-volatile data store, wherein the query engine accesses the segment of the log structure in the volatile memory when applying MVCC to select different versions of data in the database according to transaction commit times.

15. The one or more non-transitory, computer-readable storage media of claim 14, storing further program instructions that when executed on or across the one or more computing devices, cause the query engine to further implement:
receiving a request to access the data of the database;
determining a snapshot time for performing the request to access the data of the database;
identifying an associated database transaction for one of the versions of the data of the database;
determining that associated database transaction is not described by one or more segments, including the segment, in the volatile memory;
loading a different segment from the non-volatile data store that describes the associated database transaction into the volatile memory;
determining a status or commit time for the associated database transaction from accessing the different segment; and
determining to use the one version of the data by applying time-based MVCC according to the snapshot time and the determined status or commit time for the associated database transaction.

16. The one or more non-transitory, computer-readable storage media of claim 15, wherein the log structure comprises an array storing a plurality of database transactions, including the database transaction, and wherein respective index values for locating corresponding individual ones of the plurality of database transactions are determined based, at least in part, on respective transaction identifiers for the plurality of database transactions.

17. The one or more non-transitory, computer-readable storage media of claim 14, storing further program instructions that when executed on or across the one or more computing devices, cause the query engine to further implement:
  receiving a request to access the data of the database;
  determining a snapshot time for performing the request to access the data of the database;
  identifying an associated database transaction for one of the versions of the data of the database;
  determining that the segment in the volatile memory describes the associated database transaction;
  accessing the segment to determine a status or commit time for the associated database transaction; and
  determining to use the version of the data by applying time-based MVCC according to the snapshot time and the determined status or commit time for the associated database transaction.

18. The one or more non-transitory, computer-readable storage media of claim 14, storing further program instructions that when executed on or across the one or more computing devices, cause the query engine to further implement:
  determining a cut-off commit time for providing snapshot isolation at the query engine;
  identifying one or more time segments stored in the volatile memory with a latest commit time earlier than the cut-off commit time;
  converting the identified one or more time segments to one or more status segments of the commit log; and
  reclaiming storage space in the volatile memory freed by the conversion to the one or more status segments.

19. The one or more non-transitory, computer-readable storage media of claim 14, wherein updating the segment updates a minimum commit time or a maximum commit time stored in the segment with the assigned commit time.

20. The one or more non-transitory, computer-readable storage media of claim 14, wherein the database system is a database service implemented as part of a provider network and wherein the data of the database and the non-volatile data store are implemented as part of a storage service implemented as part of the provider network.

\* \* \* \* \*